June 16, 1942.  K. B. DAFFORN ET AL  2,286,470
ELECTRIC TEAKETTLE
Filed April 9, 1941  2 Sheets-Sheet 1
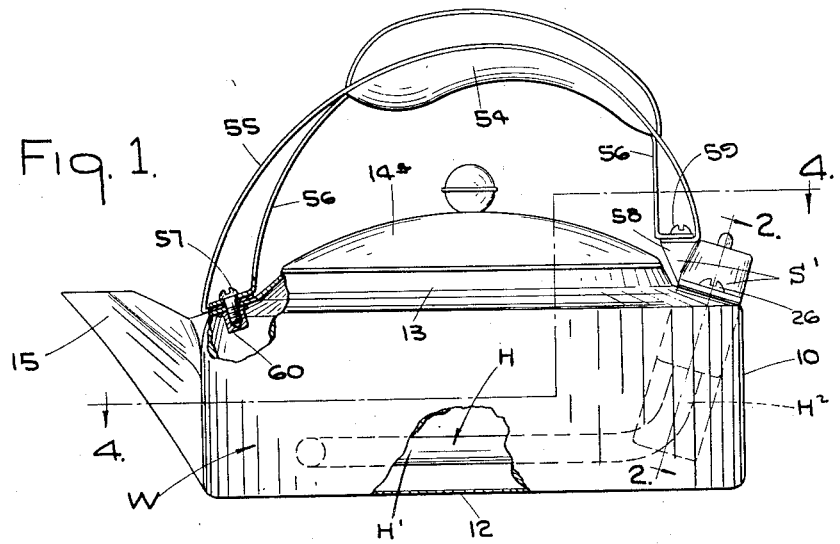
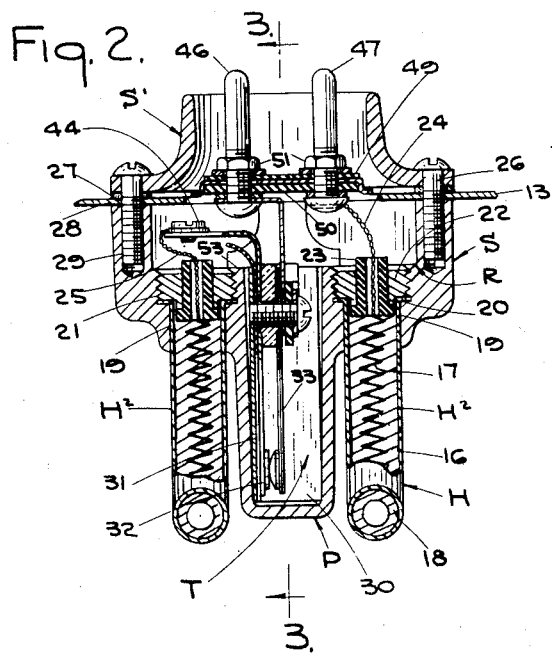 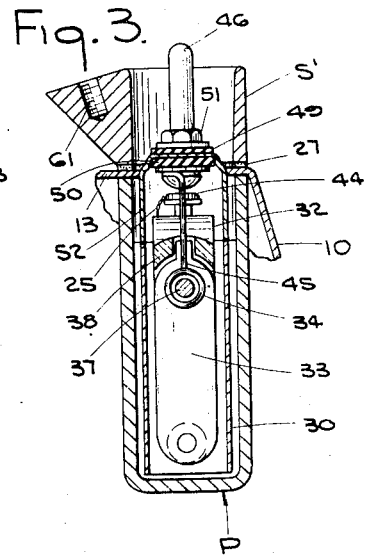
INVENTORS-
KENNETH B. DAFFORN
AND RUSSELL I. HUFFMAN
BY
ATTORNEYS June 16, 1942.     K. B. DAFFORN ET AL     2,286,470
ELECTRIC TEAKETTLE
Filed April 9, 1941     2 Sheets-Sheet 2
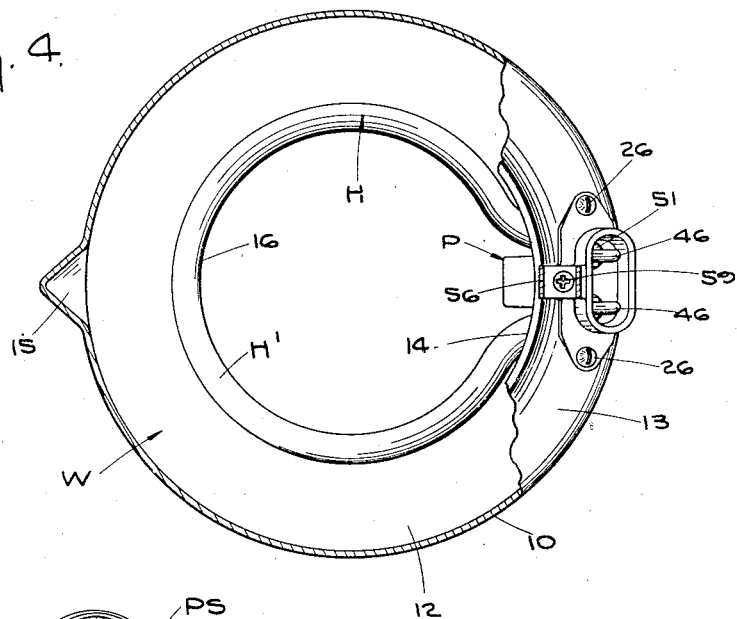
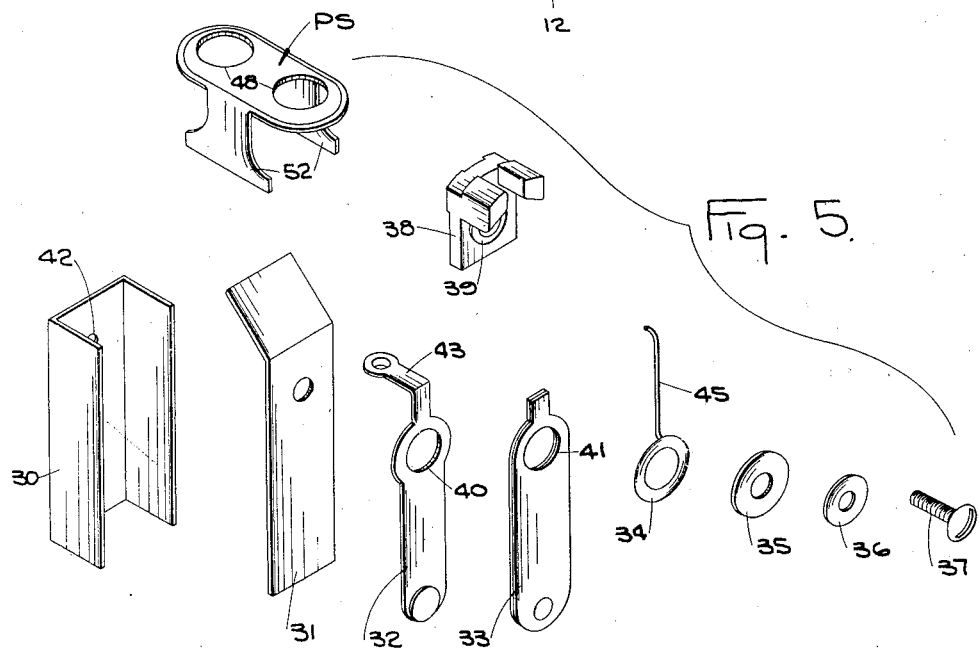
INVENTORS
KENNETH B. DAFFORN
AND RUSSELL I. HUFFMAN
BY Bair & Freeman
ATTORNEYS Patented June 16, 1942

2,286,470

UNITED STATES PATENT OFFICE 2,286,470

ELECTRIC TEAKETTLE

Kenneth B. Dafforn and Russell I. Huffman, Dover, Ohio, assignors to Knapp-Monarch Company, St. Louis, Mo., a corporation of Missouri Application April 9, 1941, Serial No. 387,596

9 Claims. (Cl. 219—44)

Our present invention relates to a teakettle of the electric type.

One object of the invention is to provide a comparatively inexpensive construction having self-supported means for heating water in the teakettle and thermostatic means to control the current to the heating element of the teakettle so as to prevent boiling away of the water.

Another object is to provide a teakettle with a heating element of the encased type together with efficient means for supporting the heating element with respect to the teakettle and simple means to make electrical connections with the heating element.

Still another object is to provide an arrangement of heating element support and thermostat for the heating element which may be readily assembled, and to provide means for quickly connecting a simple handle structure with the teakettle.

With these and other objects in view, our invention consists in the construction, arrangement and combination of the various parts of our device whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention both from its structural and functional standpoints. Accordingly, we have illustrated a preferred and desirable embodiment of the invention in the accompanying drawings, in which:

Figure 1 is a side elevation of a teakettle embodying our invention, portions of the water container thereof being broken away to show internal construction;

Figure 2 is an enlarged sectional view on the line 2—2 of Figure 1, showing heating element, current supply prong and thermostat connections;

Figure 3 is a sectional view on the line 3—3 of Figure 2;

Figure 4 is a partial plan view as taken on the line 4—4 of Figure 1 with parts of the invention shown in section, and Figure 5 is an exploded perspective view of a thermostat and current supply prong mounting means of our teakettle.

On the accompanying drawings, we have used the reference character W to indicate in general a water container. The water container W has a cylindrical wall 10, a bottom wall 12 and an upper wall 13. The wall 13 has an opening 14 therein adjacent the center of the wall to cooperate with a lid 14a for the teakettle. The water container W also has a spout indicated at 15. The parts W and 14a may be made of spun aluminum or the like.

For heating water in the container W, we provide a heating element indicated generally at H. The heating element H consists of a casing 16, at the center of which is a coiled resistance wire 17 filled with and surrounded by argillous material 18 for insulating the resistance wire from the casing 16 and transmitting heat from the heating element to the casing.

The heating element H has a ringlike portion $H^1$ and a pair of terminal ends $H^2$ which are curved upwardly from the ringlike portion $H^1$, as shown particularly in Figures 1 and 4. The terminal ends $H^2$ extend upwardly through bores 19 in a socket fitting S. The extreme upper ends of the portions $H^2$ of the heating element are then flanged over as at 20 and the flanges are tightened against threaded counterbores 21 in the fitting S. Lock nuts 22 are tightened down against the flanges 20 to form a water-tight seal and to receive insulating bushings 23, through which doubled terminal ends 24 and 25 of the resistance wire 17 extend.

The fittings S is secured against the lower surface of the top wall 13 opposite the spout 15 by screws 26. The screws 26 extend through a shield $S^1$, through a gasket 27, through openings 28 in the wall, and are then screwed into threaded openings 29 of the fitting S.

The fitting S has a pocket P depending between the terminal ends $H^2$ of the heating element H and adapted to receive a thermostat indicated generally at T. The thermostat T consists of a channel shaped support 30 and parts 31, 32, 33, 34, 35, 36, 37 and 38 mounted therein. The part 31 is a sheet of insulation. Parts 32 and 33 are contact members, part 32 being a spring member and part 33 a bimetal strip. The parts 32 and 33 are mounted on opposite sides of part 38, which is formed of porcelain or similar insulating material. Part 38 has ringlike projections 39 on opposite sides thereof to enter openings 40 and 41 of the switch blades 32 and 33 to insulate them from the screw 37 used for assembling the parts together. The screw 37 extends through part 36 which is a metal washer, through part 35 which is of insulation, through part 34 constituting one terminal for the thermostatic switch, and then through parts 33, 38, 32 and 31, respectively. The screw is finally screwed into a threaded opening 42 of the channel shaped support 30, thereby holding the various parts in their assembled relation.

Switch blade 32 has a terminal extension 43 adapted to be secured as by a terminal screw 44 to the resistance wire lead 25. Part 34 has a wire 45 connected with a current supply terminal prong 46. Another prong 47 is connected with the resistance wire lead 24.

The prongs 46 and 47 are supported by a prong supporting member PS. The member PS has enlarged openings 48 through which the prongs 46 and 47 extend, and sheets of insulation 49 and 50 are provided above and below the member PS to insulate the prongs therefrom. In the final assembly, lock nuts 51 are mounted on the prongs 46 and 47.

The member PS has a pair of supporting legs 52 which are supported on a countersunk surface 53 of the socket fitting S. The legs 52, as shown in Figure 3, are in alignment with the side flanges of the channel shaped member 30 to retain it in assembled position in the pocket P.

A handle 54 is mounted on the water container W. The handle may be made of wood or suitable insulating material having upper and lower straps 55 and 56 for supporting it. The straps 55 and 56 are secured to the upper wall 13 by a screw 57 and to a projection 58 on the shield member S¹ by a screw 59. The screw 57 is threaded into a nut 60 inside the water container W, while the screw 59 is screwed into a threaded socket 61 of the projection 58.

The usual current supply plug may be positioned on the prongs 46 and 47 to supply current to the heating element H. The thermostat T may be preset at the factory to cut off the current between 200° and 210°, so that boiling of the water is prevented. Thus, water in the teakettle may be brought to adjacent the boiling point and efficiently kept there without waste of current resulting from boiling away of the water after it has attained boiling temperature.

The arrangement disclosed is such that the thermostat may be readily preassembled and placed in the fitting S and the heating element H connected with the fitting and then the heating element and fitting mounted on the top wall 13 of the teakettle. When the container W is made of aluminum, it is unnecessary to provide a gasket between it and the fitting S or the nut 60 to prevent leakage, as tightening of the screws 26 and 57 causes the parts S and 60 to bite into the relatively soft aluminum and form an effective seal. Thereafter, even though the teakettle is filled with water, there is no leakage into the fitting S and the thermostat pocket P.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. An electric teakettle comprising a water container having a cylindrical wall, a spout at one side thereof, said container including an upper wall extending inwardly from the periphery of said cylindrical wall and defining a central opening, a removable lid for said control opening, an elongated encased heating element formed in the shape of a pair of arms and a ring of less diameter than said cylindrical wall, means for suspending said heating element in said water container with said ring adjacent the bottom thereof and said arms curved upwardly away from said ring and toward said upper wall, said means including a socket fitting depending from the lower surface of said upper wall, the terminal ends of said arms extending into said socket fitting, means to seal said terminal ends relative thereto, said socket fitting having a pocket depending between the terminal ends of said heating element, a thermostat in said pocket, and current supply prongs connected with said heating element and thermostat.

2. An electric teakettle comprising a water container having a cylindrical wall, a spout at one side thereof, an upper wall extending inwardly from the periphery of said cylindrical wall, a lid at the center of said upper wall, an encased heating element formed in the shape of a pair of arms and a ring of less diameter than said cylindrical wall, means for suspending said heating element in said water container adjacent the bottom thereof with said arms extending upwardly toward said upper wall, said means including a socket fitting secured to the lower surface of said upper wall opposite said spout, the terminal ends of said arms extending into said socket fitting, packing nuts in said socket fitting to seal said terminal ends relative to the fitting, said socket fitting having a pocket, a thermostat in said pocket, current supply prongs mounted on said socket fitting, said upper wall having an opening for said prongs to extend through to a position above said upper wall, a shield surrounding said prongs, screws through said shield, through said upper wall and into said socket fitting to retain the shield and socket fitting assembled, and a handle having one end mounted on said shield and its other end mounted on said top wall adjacent said spout.

3. An electric teakettle comprising a water container having a cylindrical wall, a spout at one side thereof, an upper wall extending inwardly from the periphery of said cylindrical wall, a lid at the center of said upper wall, an encased heating element formed in the shape of a pair of arms and a ring of less diameter than said cylindrical wall, means for suspending said heating element in said water container adjacent the bottom thereof with said arms curved upwardly toward said upper wall, said means including a socket fitting secured to the lower surface of said upper wall, said terminal ends extending into said socket fitting, means to seal said terminal ends relative to the fitting, a thermostat for said heating element, current supply prongs mounted on said socket, said upper wall having an opening for said prongs to extend through to a position above said upper wall, and screws through said upper wall and into said socket fitting to retain the socket fitting in mounted position.

4. In an electric teakettle, a water container including a bottom, a cylindrical wall and an upper wall, an encased heating element suspended in said water container adjacent the bottom thereof and having its terminal ends curved upwardly toward said upper wall, a socket fitting secured to the lower surface of said upper wall opposite said spout, said terminal ends extending into said socket fitting and having their casings in heat conducting relation thereto, said socket fitting having a pocket depending between said terminals ends, and a thermostat for said heating element mounted in said pocket.

5. In an electric teakettle, a water container including a bottom, a cylindrical wall and an upper wall, an encased heating element suspended in said water container adjacent the bottom thereof and having separate terminal ends curved upwardly toward said upper wall, and a socket fitting secured to the lower surface of said upper wall and depending into said water container opposite said spout, said terminal ends each extending into said socket fitting and means for sealing each of said terminal ends relative to said fitting.

6. An electric teakettle comprising a water container, an encased heating element formed in the shape of a pair of arms and a ring of less diameter than said container, means for suspending said heating element in said water container, said heating element having said arms extending upwardly toward the top of said container, a socket fitting receiving said terminal ends, packing nuts in said socket fitting to seal said terminal ends relative to the fitting, said socket fitting having a pocket depending between the terminal ends of said heating element and in heat conducting relation to their casings, and a thermostat located in said pocket.

7. In an electric teakettle, a water container having a cylindrical wall, a spout at one side thereof, an upper wall extending inwardly from the periphery of said cylindrical wall and terminating at a position defining a central opening, an encased heating element formed in the shape of a pair of arms and a ring of less diameter than said cylindrical wall, means for suspending said heating element in said water container adjacent the bottom thereof with said arms extending upwardly toward said upper wall, a socket fitting secured to the lower surface of said upper wall, said terminal ends extending into said socket fitting and sealed relative thereto, prongs mounted on said socket fitting and projecting above said upper wall, and means for connecting said prongs with said heating element.

8. An electric teakettle comprising a water container, an encased heating element in the form of a ring suspended in said water container adjacent the bottom thereof, said ring having separate arms spaced from each other and extending upwardly toward the top of said container, a socket fitting secured in depending position to the lower surface of said top, said terminal ends of said arms extending into said socket fitting and sealed relative thereto, and current supply prongs mounted on said socket fitting and projecting above said top.

9. An electric teakettle comprising a water container having a cylindrical wall, a spout at one side thereof, an upper wall extending inwardly from the periphery of said cylindrical wall, an encased heating element formed in the shape of a pair of separate arms and a ring of less diameter than said cylindrical wall, means for suspending said heating element in said water container adjacent the bottom thereof with said arms extending upwardly toward said upper wall, said means including a socket secured to the lower surface of said upper wall, the terminal ends of said arms extending individually into said socket fitting, current supply prongs carried by said socket fitting and electrically connected with said heating element, and a handle for said container having its ends supported on said top wall adjacent said spout and on said socket fitting.

KENNETH B. DAFFORN.
RUSSELL I. HUFFMAN.